(12) United States Patent
Goto (10) Patent No.: US 8,529,691 B2
(45) Date of Patent: Sep. 10, 2013

(54) JOINT FILLER COMPOSITION

(75) Inventor: Tsuyoshi Goto, Tokyo (JP)

(73) Assignee: Yoshino Gypsum Co., Ltd., Tokyo (JP)

( * ) Notice: Subject to any disclaimer, the term of this patent is extended or adjusted under 35 U.S.C. 154(b) by 0 days.

(21) Appl. No.: 13/453,031

(22) Filed: Apr. 23, 2012

(65) Prior Publication Data

US 2012/0285348 A1    Nov. 15, 2012

(30) Foreign Application Priority Data

May 9, 2011 (JP) .................................. 2011-104523
Mar. 27, 2012 (JP) .................................. 2012-072169

(51) Int. Cl.
| C04B 11/00 | (2006.01) |
| C04B 14/00 | (2006.01) |
| C04B 14/10 | (2006.01) |
| C04B 14/20 | (2006.01) |
| C04B 14/24 | (2006.01) |
| C04B 28/14 | (2006.01) |

(52) U.S. Cl.
USPC .......................................... 106/773; 106/782

(58) Field of Classification Search
USPC .................... 106/773, 811, 814, 817, 782
See application file for complete search history.

(56) References Cited

U.S. PATENT DOCUMENTS

| 4,391,647 | A | * | 7/1983 | Deer et al. | ..................... 523/218 |
| 6,673,144 | B2 | * | 1/2004 | Immordino et al. | .......... 106/778 |
| 7,594,963 | B2 | * | 9/2009 | Bonetto et al. | ................ 106/778 |
| 2006/0156961 | A1 | * | 7/2006 | Langford | ..................... 106/778 |

FOREIGN PATENT DOCUMENTS

| GB | 2048235 | | 12/1980 |
| JP | 55-144459 | | 11/1980 |
| JP | 58-35799 | | 8/1983 |
| JP | 59-19059 | | 5/1984 |
| JP | 60223848 A | * | 11/1985 |
| JP | 2001-040277 | | 2/2001 |

OTHER PUBLICATIONS

R. C. Mackenzie, "The Classification and Nomenclature of Clay Minerals", Clay Mineral Classification, Clay Minerals Bull. 4, pp. 52-66, 1959.

* cited by examiner

*Primary Examiner* — Anthony J Green
(74) *Attorney, Agent, or Firm* — IPUSA, PLLC (57) ABSTRACT

A joint filler composition may include 100 parts by mass of a base material, 1 to 20 parts by mass of inorganic hollow particles, and 3 to 20 parts by mass of a mineral having a chain structure or a layer structure.

13 Claims, 8 Drawing Sheets

FIG.1

| SAMPLE NO. | | | EMBODIMENT Emb1 | | | | | 1ST COMPARISON EXAMPLE | | | |
|---|---|---|---|---|---|---|---|---|---|---|---|
| | | | 011 | 012 | 013 | 014 | 015 | 111 | 112 | 113 | 114 |
| COMPOSITION (PARTS BY MASS) | BASE MATERIAL | CALCIUM SULFATE HEMIHYDRATE | 100 | | | | | | | | |
| | INORGANIC HOLLOW PARTICLES | SHIRASU BALLOON | 13 | 1 | 20 | 5 | 15 | | 13 | | 25 |
| | | FLYASH | | | | | | | | | |
| | | PERLITE | | | | | | | | | |
| | | GLASS BALLOON | | | | | | | | | |
| | MINERAL HAVING CHAIN STRUCTURE OR LAYER STRUCTURE | MICA | 13 | 20 | 4 | 15 | 5 | | | 13 | |
| | | WOLLASTONITE | | | | | | | | | |
| | | ATTAPULGITE | | | | | | | | | |
| | | BENTONITE | | | | | | | | | |
| | | SEPIOLITE | | | | | | | | | |
| | RESIN AGENT | | | | | | 5 | | | | |
| | SET ADJUSTING AGENT | | 2 | | | | | | | | |
| | THICKENER | | 0.5 | | | | | | | | |
| | WATER | | 90 | 75 | 90 | 80 | 80 | 45 | 70 | 65 | 90 |
| RESULTS | WATER/POWDER (%) | | 67 | 58 | 68 | 63 | 63 | 42 | 58 | 54 | 68 |
| | SHRINKAGE (mm) | | 0.2 | 0.4 | 0.4 | 0.3 | 0.3 | 1.0 | 0.8 | 1.0 | 0.2 |
| | WORKABILITY | | ○ | ○ | ○ | ○ | ○ | ○ | ○ | ○ | × |
| | NUMBER OF TIMES COATED UNTIL JOINT PART BECOMES SMOOTH | | 2 | 2 | 2 | 2 | 2 | 3 | 3 | 3 | - |

FIG.2

| SAMPLE NO. | | EMBODIMENT Emb2 ||||| 2ND COMPARISON EXAMPLE ||||
|---|---|---|---|---|---|---|---|---|---|---|
| | | 021 | 022 | 023 | 024 | 025 | 121 | 122 | 123 | 124 |
| COMPOSITION (PARTS BY MASS) | BASE MATERIAL CALCIUM SULFATE HEMIHYDRATE | 100 | | | | | | | | |
| | INORGANIC HOLLOW PARTICLES | SHIRASU BALLOON | 1 | 20 | | | | 13 | | | 0.1 |
| | | FLYASH | | | 13 | | | | 25 | 13 | |
| | | PERLITE | | | | 1 | | | | | |
| | | GLASS BALLOON | | | | | 13 | | | | |
| | MINERAL HAVING CHAIN STRUCTURE OR LAYER STRUCTURE | MICA | 20 | | | | | | | | |
| | | WOLLASTONITE | | 4 | | | | 25 | | 1 | |
| | | ATTAPULGITE | | | 13 | | | | 13 | | 13 |
| | | BENTONITE | | | | 13 | | | | | |
| | | SEPIOLITE | | | | | 4 | | | | |
| | RESIN AGENT | | 5 | | | | | | | | |
| | SET ADJUSTING AGENT | | 2 | | | | | | | | |
| | THICKENER | | 0.5 | | | | | | | | |
| | WATER | | 75 | 80 | 95 | 70 | 80 | 110 | 110 | 70 | 70 |
| | WATER/POWDER (%) | | 58 | 61 | 71 | 58 | 64 | 76 | 76 | 58 | 58 |
| RESULTS | SHRINKAGE (mm) | | 0.5 | 0.4 | 0.5 | 0.5 | 0.5 | 0.3 | 0.2 | 0.7 | 0.9 |
| | WORKABILITY | | ○ | ○ | ○ | ○ | ○ | × | × | ○ | ○ |
| | NUMBER OF TIMES COATED UNTIL JOINT PART BECOMES SMOOTH | | 2 | 2 | 2 | 2 | 2 | — | — | 3 | 3 |

FIG.3

| SAMPLE NO. | | | | 031 | EMBODIMENT Emb3 | | | | | 3RD COMPARISON EXAMPLE | | | |
|---|---|---|---|---|---|---|---|---|---|---|---|---|---|
| | | | | | 032 | 033 | 034 | 035 | 131 | 132 | 133 | 134 |
| COMPOSITION (PARTS BY MASS) | BASE MATERIAL | CALCIUM CARBONATE | | 100 | | | | | | | | | |
| | INORGANIC HOLLOW PARTICLES | SHIRASU BALLOON | | 13 | 1 | 20 | 5 | 15 | | 13 | | 25 |
| | | FLYASH | | | | | | | | | | |
| | | PERLITE | | | | | | | | | | |
| | | GLASS BALLOON | | | | | | | | | | |
| | MINERAL HAVING CHAIN STRUCTURE OR LAYER STRUCTURE | MICA | | 13 | 20 | 4 | 15 | 5 | | | 13 | |
| | | WOLLASTONITE | | | | | | | | | | |
| | | ATTAPULGITE | | | | | | | | | | |
| | | BENTONITE | | | | | | | | | | |
| | | SEPIOLITE | | | | | | | | | | |
| | RESIN AGENT | | | | | | | 5 | | | | |
| | THICKENER | | | | | | | 0.5 | | | | |
| | WATER | | | 80 | 65 | 80 | 70 | 70 | 35 | 60 | 55 | 80 |
| | WATER/POWDER (%) | | | 61 | 51 | 62 | 56 | 56 | 33 | 51 | 46 | 61 |
| RESULTS | SHRINKAGE (mm) | | | 0.4 | 0.8 | 0.6 | 0.8 | 0.8 | 1.5 | 1.2 | 1.4 | 0.8 |
| | WORKABILITY | | | ○ | ○ | ○ | ○ | ○ | ○ | ○ | ○ | × |
| | NUMBER OF TIMES COATED UNTIL JOINT PART BECOMES SMOOTH | | | 3 | 3 | 3 | 3 | 3 | 4 | 4 | 4 | — |

FIG.4

| SAMPLE NO. | | | EMBODIMENT Emb4 | | | | | 4TH COMPARISON EXAMPLE | | | |
|---|---|---|---|---|---|---|---|---|---|---|---|
| | | | 041 | 042 | 043 | 044 | 045 | 141 | 142 | 143 | 144 |
| COMPOSITION (PARTS BY MASS) | BASE MATERIAL | CALCIUM CARBONATE | | | | | 100 | | | | |
| | | SHIRASU BALLOON | | | | | | | | | 0.1 |
| | INORGANIC HOLLOW PARTICLES | FLYASH | 1 | 20 | | | | 13 | 25 | 13 | |
| | | PERLITE | | | 13 | | | | | | |
| | | GLASS BALLOON | | | | 1 | 13 | | | | |
| | | MICA | 20 | | | | | | | | |
| | MINERAL HAVING CHAIN STRUCTURE OR LAYER STRUCTURE | WOLLASTONITE | | 4 | | | | 25 | | 1 | |
| | | ATTAPULGITE | | | 13 | | | | 13 | | 13 |
| | | BENTONITE | | | | 13 | | | | | |
| | | SEPIOLITE | | | | | 4 | | | | |
| | RESIN AGENT | | | | | | 5 | | | | |
| | THICKENER | | | | | | 0.5 | | | | |
| | WATER | | 65 | 70 | 85 | 60 | 70 | 100 | 100 | 60 | 60 |
| | WATER/POWDER (%) | | 51 | 54 | 65 | 50 | 57 | 70 | 70 | 50 | 51 |
| RESULTS | SHRINKAGE (mm) | | 1.0 | 0.8 | 1.0 | 1.0 | 1.0 | 0.6 | 0.4 | 1.2 | 1.5 |
| | WORKABILITY | | ○ | ○ | ○ | ○ | ○ | × | × | ○ | ○ |
| | NUMBER OF TIMES COATED UNTIL JOINT PART BECOMES SMOOTH | | 3 | 3 | 3 | 3 | 3 | — | — | 4 | 4 |

| SAMPLE NO. | | 051 | 052 | 053 | EMBODIMENT Emb5 054 | 055 | 056 |
|---|---|---|---|---|---|---|---|
| COMPOSITION (PARTS BY MASS) | BASE MATERIAL | CALCIUM SULFATE HEMIHYDRATE | 100 | | | | | |
| | INORGANIC HOLLOW PARTICLES | SHIRASU BALLOON | 13 | 13 | 13 | 13 | 13 | 13 |
| | | FLYASH | | | | | | |
| | | PERLITE | | | | | | |
| | | GLASS BALLOON | | | | | | |
| | MINERAL HAVING CHAIN STRUCTURE OR LAYER STRUCTURE | MICA | 13 | 13 | 13 | 13 | 13 | 13 |
| | | WOLLASTONITE | | | | | | |
| | | ATTAPULGITE | | | | | | |
| | | BENTONITE | | | | | | |
| | | SEPIOLITE | | | | | | |
| | CMC-Na | | 0 | 0.01 | 0.02 | 0.1 | 0.5 | 0.6 |
| | RESIN AGENT | | 5 | | | | | |
| | SET ADJUSTING AGENT | | 2 | | | | | |
| | THICKENER | | 0.5 | | | | | |
| | WATER | | 90 | 92 | 95 | 100 | 120 | 130 |
| | WATER/POWDER (%) | | 67 | 69 | 71 | 75 | 90 | 97 |
| RESULTS | SHRINKAGE (mm) | | 1.0 | 0.8 | 0.6 | 0.5 | 0.6 | 1.0 |
| | WORKABILITY | | ○ | ○ | ○ | ○ | ○ | △ |
| | NUMBER OF TIMES COATED UNTIL JOINT PART BECOMES SMOOTH | | 3 | 3 | 2 | 2 | 2 | 3 |

FIG.7

| SAMPLE NO. | | | 061 | 062 | 063 | 064 | 065 | 066 |
|---|---|---|---|---|---|---|---|---|
| | | | | | EMBODIMENT Emb6 | | | |
| COMPOSITION (PARTS BY MASS) | BASE MATERIAL | CALCIUM CARBONATE | 100 | | | | | |
| | INORGANIC HOLLOW PARTICLES | SHIRASU BALLOON | 13 | 13 | 13 | 13 | 13 | 13 |
| | | FLYASH | | | | | | |
| | | PERLITE | | | | | | |
| | | GLASS BALLOON | | | | | | |
| | MINERAL HAVING CHAIN STRUCTURE OR LAYER STRUCTURE | MICA | 13 | 13 | 13 | 13 | 13 | 13 |
| | | WOLLASTONITE | | | | | | |
| | | ATTAPULGITE | | | | | | |
| | | BENTONITE | | | | | | |
| | | SEPIOLITE | | | | | | |
| | CMC-Na | | 0 | 0.01 | 0.02 | 0.1 | 0.5 | 0.6 |
| | RESIN AGENT | | 5 | | | | | |
| | THICKENER | | 0.5 | | | | | |
| RESULTS | WATER | | 80 | 82 | 85 | 90 | 110 | 120 |
| | WATER/POWDER (%) | | 61 | 62 | 65 | 68 | 83 | 91 |
| | SHRINKAGE (mm) | | 3.0 | 2.7 | 2.3 | 2.0 | 2.3 | 3.0 |
| | WORKABILITY | | ○ | ○ | ○ | ○ | ○ | △ |
| | NUMBER OF TIMES COATED UNTIL JOINT PART BECOMES SMOOTH | | 5 | 5 | 4 | 4 | 4 | 5 |

FIG.8

JOINT FILLER COMPOSITION

CROSS-REFERENCE TO RELATED APPLICATIONS

This application is based upon and claims the benefit of priority of the prior Japanese Patent Applications No. 2011-104523 filed on May 9, 2011 and No. 2012-072169 filed on Mar. 27, 2012, the entire contents of which are incorporated herein by reference.

BACKGROUND OF THE INVENTION

1. Field of the Invention

The present invention generally relates to joint filler compositions, and more particularly to a joint filler composition that fills a joint part between adjacent base members (or furrings) in order to make a height of the joint part approximately the same as that of a surface of the base members, when performing an interior finishing work on an inner wall or a ceiling of a building, for example.

A joint filler composition may sometimes be referred to as a joint filling material, a joint sealing material, or a joint sealer.

2. Description of the Related Art

When performing the interior finishing work of the building, a plurality of base members, such as plaster boards, plywoods, calcium silicate boards, and the like, are arranged and fixed at predetermined positions. Then, a joint filler composition is filled into a joint part between the adjacent base members. After a job-site setting until the joint filler composition dries and sets (or hardens), the joint part is sanded and smoothened in order to make the surface of the joint filler at the joint part match the surface of the adjacent base members, that is, make the surfaces of the joint part and the adjacent base members flush. Thereafter, a wall paper or the like is adhered on the flush surface, in order to finish the inner wall or the ceiling of the building.

The joint part is treated in the above described manner for the following three reasons (1)-(3), for example.
(1) To eliminate a stepped part or a gap at the joint in order to hide the joint;
(2) To reinforce the joint in order to prevent cracks from forming; and
(3) To fill the joint and improve heat resistance and sound insulation.

The joint filler composition may generally be categorized into a drying type and a setting type.

An example of the drying type joint filler composition is proposed in a Japanese Published Utility Model Application No. 58-35799. The proposed joint filler composition includes calcium carbonate as a base material, mixed with a binder, such as stone powder and a resin bonding agent. The proposed joint filler composition may be coated with ease, and a satisfactory surface finishing may be obtained. Because the drying type joint filler composition does not cure unless dried, the drying type joint filler composition may be prepared in the form of a paste at the manufacturer and forwarded in a container, such as a can, a cartridge, and the like, so that it is unnecessary to mix material and water at the construction site. However, after the drying type joint filler composition is coated and dried, the joint filler composition contracts, and the so-called depression may occur. The shrinkage of the joint filler composition may cause cracks to form. For these reasons, the drying type joint filler composition is mainly used in the finishing stage in which the coating thickness is relatively thin.

On the other hand, examples of the setting type joint filler composition are described in a Japanese Published Patent Application No. 59-19059 and a Japanese Laid-Open Patent Application No. 55-144459. The proposed joint filler compositions include hemihydrate gypsum or hemihydrate plaster as a base material, mixed with a bonding agent and other additives. Because the proposed joint filler compositions include as the base material, hemihydrate plaster that expands by hydration curing, the amount of shrinkage after the curing is smaller compared to that of the drying type joint filler composition. For this reason, the setting type joint filler composition is often used for the undercoating (or base coating) that requires a relatively thick coating, because the shrinkage or the so-called depression is relatively small. However, even in the case of the setting type joint filler composition, when mixing water is absorbed by the undercoating before the joint filler composition undergoes the hydration setting, the joint filler composition coated at the joint part contracts and the shrinkage or the so-called depression occurs.

Accordingly, both types of the joint filler composition described above contract, and the surface of the joint filler composition filled into the joint part of the undercoatings (or base members) and the surfaces of the base undercoatings do not match, to thereby form an undulation (or concavo-convex). When the wall paper is adhered over the undercoatings having the joint part filled by the joint filler composition, the undulation underneath also appears on the wall paper and damages the external appearance of the wall paper. For this reason, the joint filler composition must be coated again and dried again and such coating and drying must be repeated until the surface of the joint filler composition filled into the joint part of the undercoatings and the surfaces of the base undercoatings approximately match. The operation to coat and dry the joint filler composition again is a troublesome operation, and in addition, each single coating requires a corresponding drying time. As a result, when the coating and drying of the joint filler composition need to be repeated, the time of completion is delayed.

In order to minimize the above described problems, a joint filler composition mixed with a lightweight aggregate including air within particles, such as hollow particles, has been proposed. An example of such a joint filler composition that reduces the shrinkage or the so-called depression forms an undercoating adjusting agent including an inorganic filler such as gypsum-calcium carbonate, a lightweight filler such as a hollow balloon perlite vermiculite, and a liquid binder having an emulsion resin as a principal component, is proposed in a Japanese Laid-Open Patent Application No. 2001-40277.

However, a mixture amount of the hollow particles must be increased in order to reduce the shrinkage or the so-called depression, and the operation of manually coating the joint filler composition by a jig such as a finishing knife takes more time as the amount of the hollow particles increases. The operation of coating the joint filler composition thus becomes more troublesome to perform. For these reasons, the amount of the hollow particles mixed in the joint filler composition is desirably limited to a predetermined amount that does not considerably deteriorate the efficiency of coating the joint filler composition, and consequently, the shrinkage or the so-called depression may not be reduced sufficiently.

Therefore, according to the conventional joint filler compositions, it is difficult to simultaneously enable coating of the joint filler composition with a satisfactory workability and sufficiently reduce the shrinkage or the so-called depression.

SUMMARY OF THE INVENTION

One object according to one aspect of the present invention may be to provide a joint filler composition that may simultaneously enable coating of the joint filler composition with a satisfactory workability and sufficiently reduce shrinkage or the so-called depression.

According to one aspect of the present invention, a joint filler composition may include 100 parts by mass of a base material, 1 to 20 parts by mass of inorganic hollow particles, and 3 to 20 parts by mass of a mineral having a chain structure or a layer structure.

DESCRIPTION OF THE PREFERRED EMBODIMENTS

The present inventor found that, when a predetermined amount of inorganic (or mineral) hollow particles and a predetermined amount of a mineral having a chain structure or a layer structure are mixed to a joint filler composition, the joint filler composition may be coated with a satisfactory workability while at the same time sufficiently reducing shrinkage or the so-called depression. The hollow particles may sometimes be referred to as bubble particles or balloon particles.

The joint filler composition according to one aspect of the present invention includes, with respect to 100 parts by mass of a base material, 1 to 20 parts by pass of the inorganic hollow particles, and 3 to 20 parts by mass of the mineral having the chain structure or the layer structure. When the effect of reducing the shrinkage or the so-called depression, the workability, the cost, and the like are taken into consideration, the joint filler composition preferably includes 5 to 15 parts by mass of the inorganic hollow particles, and 5 to 15 parts by mass of the mineral having the chain structure or the layer structure. The joint filler composition more preferably includes 8 to 15 parts by mass of the mineral having the chain structure or the layer structure.

The joint filler composition according to one aspect of the present invention may be prepared as a paste for use as a joint filler composition, by appropriately adding and mixing water, a resin agent (polyvinyl alcohol, polyvinyl acetate resin, etc.), a thickener (cellulose ether such as methylcellulose, methyl hydroxyethyl cellulose, ethyl hydroxyethyl cellulose, hydroxypropyl methylcellulose, etc.), and the like in addition to the above. The set adjusting agent (gypsum dehydrate, etc.) can be used when the base material is calcium sulfate hemihydrates.

The base material may be the same as that of the existing or conventional joint filler compositions. More particularly, the base material may be calcium sulfate hemihydrate or calcium carbonate.

The inorganic hollow particles may be made of any suitable material, such as inorganic compounds, minerals, and the like, as long as the particles are hollow. From the point of view of safety and easiness of acquisition of the material, the inorganic hollow particles are preferably made of Shirasu Balloon, flyash, perlite, glass balloon, or the like. The Shirasu Balloon is particularly preferable for use as the inorganic hollow particles. Of course, the inorganic hollow particles that is added in the joint filler composition is not limited to one kind, and a plurality of kinds of inorganic hollow particles may be added simultaneously in the joint filler composition.

The grain size or grain diameter of the inorganic hollow particles is not limited to a particular size, and may be appropriately selected by taking into consideration the location where the joint filler composition is used, the workability and/or operation ease of coating (or applying) the joint filler composition, and the like. For example, when using the joint filler composition as an undercoating, a relatively large grain size may be tolerated to an extent such that the workability and/or operation ease of coating the joint filler composition does not deteriorate. On the other hand, when using the joint filler composition as an overcoating or a finish coating (or final coating), a relatively small grain size may be preferable from the point of view of making the external appearance of the finishing surface satisfactory. In this latter case, the average grain size (or grain diameter) may be on the order of 20 μm to 300 μm order to maintain smoothness, and may more preferably be on the order of 30 μm to 150 μm.

The mineral having the chain structure or the layer structure refers to a mineral having a crystal structure in which the chain structure or the layer structure may be observed. Any suitable mineral having a crystal structure in which the chain structure or the layer structure may be observed is usable as the mineral having the chain structure or the layer structure, and the mineral having the chain structure or the layer structure is not limited to a particular mineral. From the point of view of the cost and easiness of acquisition, mica, wollastonite, bentonite, and the like having the layer structure, and attapulgite, sepiolite, and the like having the chain structure may be used as the mineral having the chain structure or the layer structure. Particularly, mica is preferably used as the mineral having the chain structure or the layer structure. Similarly as in the case of the inorganic hollow particles, the mineral having the chain structure or the layer structure, that is added in the joint filler composition, is not limited to one kind, and a plurality of kinds of minerals having the chain structure or the layer structure may be added simultaneously in the joint filler composition. Furthermore, similarly as in the case of the inorganic hollow particles, the grain size or grain diameter of the mineral having the chain structure or the layer structure is not limited to a particular size, and may be appropriately selected by taking into consideration the location where the joint filler composition is used, the workability and/or operation ease of coating (or applying) the joint filler composition, and the like.

In addition, according to one aspect of the present invention, the joint filler composition preferably includes one or more kinds of carboxy methylcellulose and salt thereof (hereinafter also referred to as "CMC and salt thereof").

The amount of the CMC and salt thereof to be added is not limited to a particular amount, and may be appropriately selected by taking into consideration the workability and/or operation ease of coating (or applying) the joint filler composition, and the like. For example, with respect to 100 parts by mass of the base material, the amount of the CMC and the salt thereof to be added may be 0.6 parts by mass or less, preferably 0.5 parts by mass or less, and more preferably 0.1 parts by mass or less.

The lower limit of the amount of the CMC and the salt thereof to be added is not limited to a particular amount. The lower limit of the amount of CMC and the salt thereof to be added is preferably greater than 0 parts by mass, and more preferably 0.02 parts by mass or greater.

The CMC and the salt thereof may be added by the amount described above. But when adding two or more kinds of CMC and the salt thereof, the total amount that is added may be the amount described above for the case in which one kind of CMC and the salt thereof are added.

Particularly in a case in which 0.02 to 0.5 parts by mass of one or more kinds of CMC and the salt thereof is added with respect to 100 parts by mass of the base material of the joint filler composition, it was confirmed that the shrinkage or the so-called depression may be reduced considerably without deteriorating the workability and/or operation ease of coating (or applying) the joint filler composition.

The CMC and the salt thereof, unlike the cellulose ethers described above as examples of the thickener, are absorbent and have an extremely good water absorbency. For this reason, it was conventionally regarded that, when the CMC and the salt thereof are used in the joint filler composition, the amount of water required to mix the joint filler composition would increase, and that the increased amount of water would cause the shrinkage or the so-called depression of the joint filler composition. However, according to experiments conducted by the present inventor, results of the experiments were contrary to the conventional viewpoint. In other words, when the CMC and the salt thereof were used in the joint filler composition according to one aspect of the present invention, the present inventor found that an effect of reducing the shrinkage or the so-called depression of the joint filler composition may be observed.

It may be regarded that the shrinkage or the so-called depression of the joint filler composition is suppressed by some kind of interaction when the inorganic hollow particles, the mineral having the chain structure or the layer structure, and the CMC and salt thereof are added simultaneously. Alternatively, it may be regarded that the shrinkage or the so-called depression of the joint filler composition is suppressed because, by the addition of the CMC and salt thereof, air bubbles included within the joint filler composition do not break (or collapse) easily when water is added to the joint filler compound and mixed to use as the joint filler composition, which in turn reduces the shrinkage or the so-called depression of the joint filler composition after the joint filler composition is coated and dried.

[Embodiments]

Next, a description will be given of embodiments of the present invention and example embodiments, by referring to the drawings.

Figure 1:
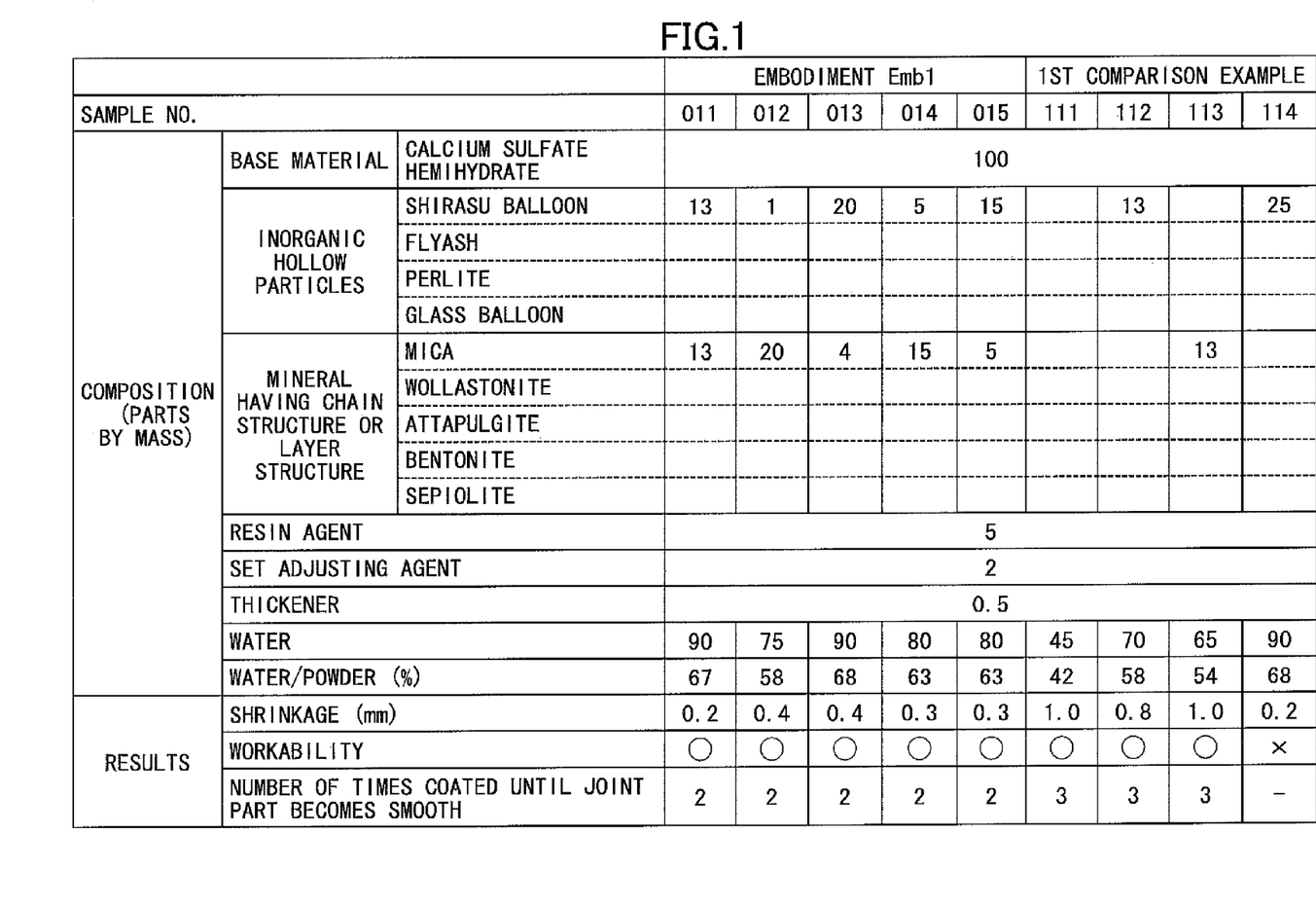
FIG. 1 is a diagram illustrating a mass ratio of materials forming a joint filler composition in an example embodiment Emb1 and a first comparison example.
Figure 2:
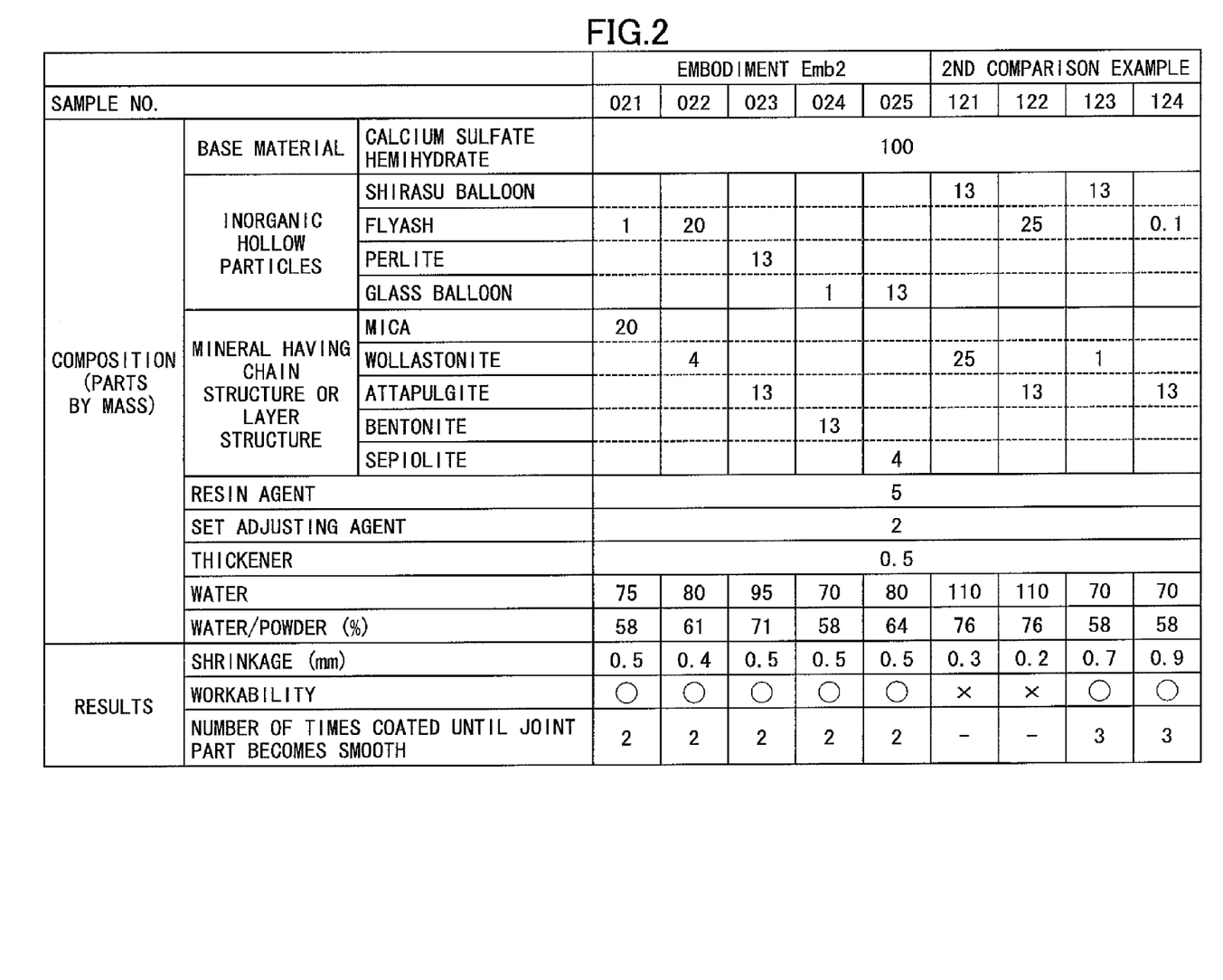
FIG. 2 is a diagram illustrating the mass ratio of materials forming the joint filler composition in an example embodiment Emb2 and a second comparison example.
Figure 3:
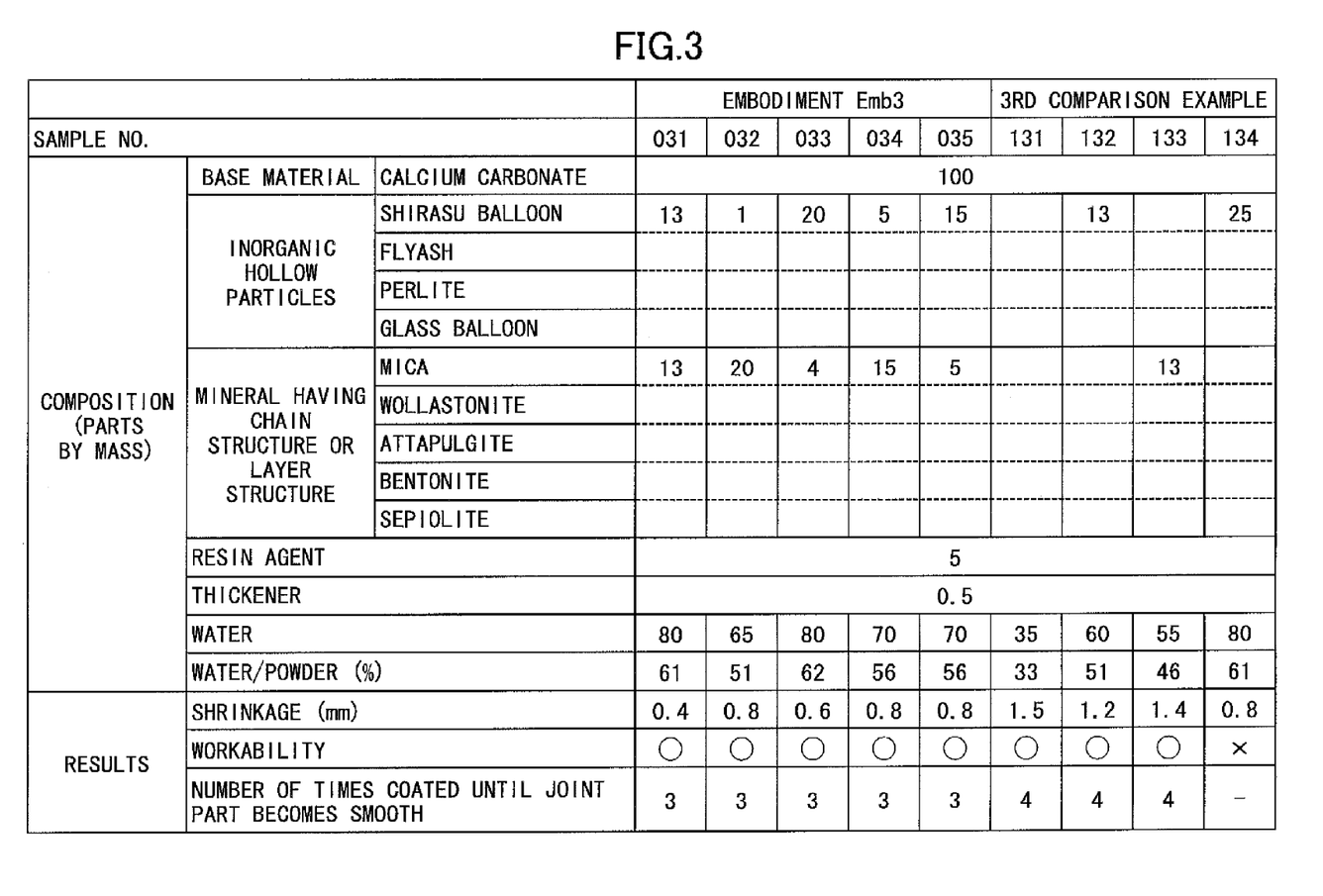
FIG. 3 is a diagram illustrating the mass ratio of materials forming the joint filler composition in an example embodiment Emb3 and a third comparison example.
Figure 4:
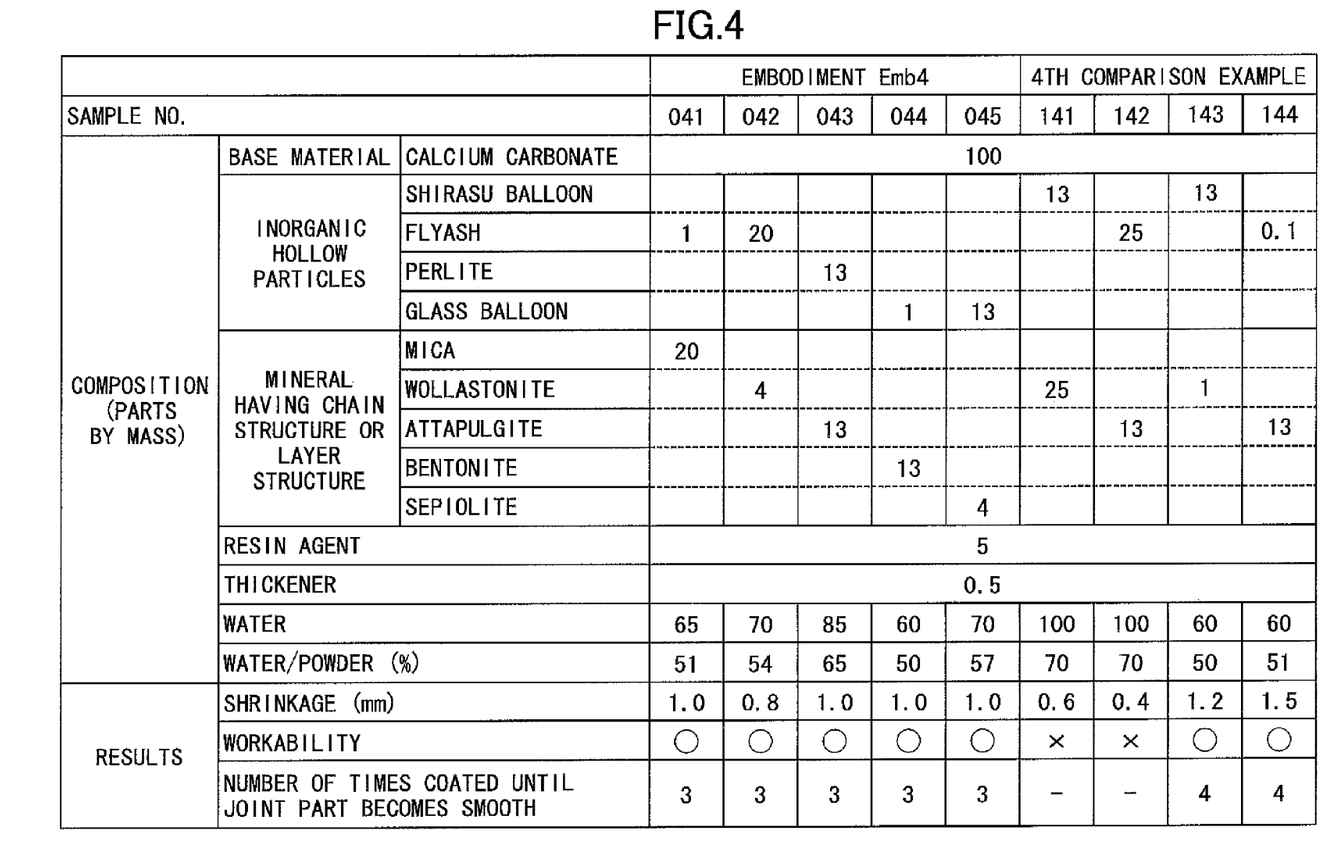
FIG. 4 is a diagram illustrating the mass ratio of materials forming the joint filler composition in an example embodiment Emb4 and a fourth comparison example.

Example embodiments Emb1 through Emb4 were created with a mass ratio of materials forming a joint filler composition illustrated in FIGS. 1 through 4, by mixing these materials, in order to obtain a joint filler composition using the joint filler composition in accordance with one aspect of the present invention. FIG. 1 is a diagram illustrating the mass ratio of materials forming the joint filler composition in the example embodiment Emb1 and a first comparison example, and FIG. 2 is a diagram illustrating the mass ratio of materials forming the joint filler composition in the example embodiment Emb2 and a second comparison example. FIG. 3 is a diagram illustrating the mass ratio of materials forming the joint filler composition in the example embodiment Emb3 and a third comparison example, and FIG. 4 is a diagram illustrating the mass ratio of materials forming the joint filler composition in the example embodiment Emb4 and a fourth comparison example.

Figure 5:
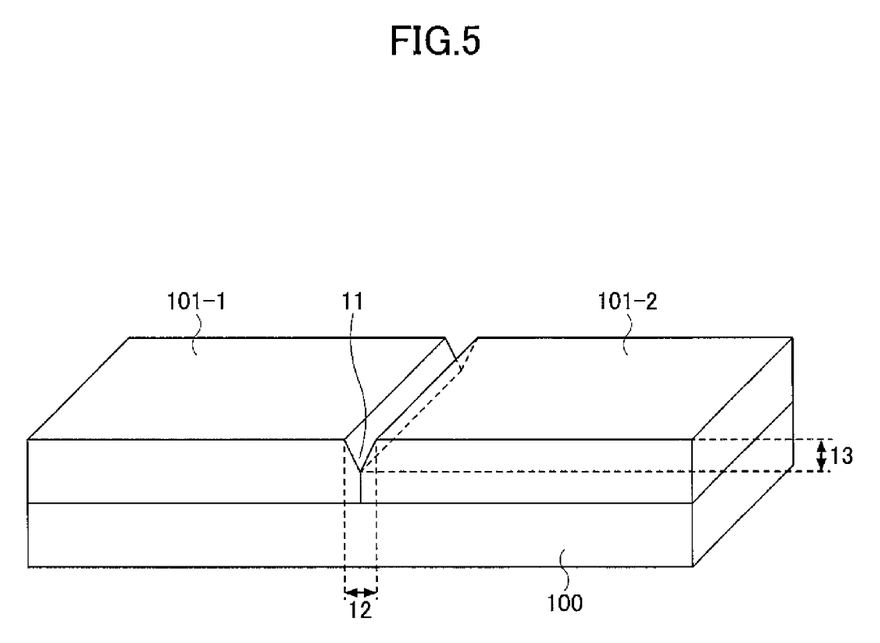
FIG. 5 is a diagram for explaining an evaluation method for the example embodiments Emb1 through Emb4.

FIG. 5 is a diagram for explaining an evaluation method for the example embodiments Emb1 through Emb4. FIG. 5 illustrates a perspective view of a base 100, and adjacent base members 101-1 and 101-2 provided on the base 100, in order to simulate the usage of the joint filler composition at the actual construction site. For example, the base members 101-1 and 101-2 are formed by plaster boards forming a joint part 11 that has a V-shaped groove. For example, the V-shaped groove has a width 12 of 6 mm, and a depth 13 of 6 mm.

The joint filler composition of the example embodiments Emb1 through Emb4 and first through fourth comparison examples were coated once on the joint part 11 to fill the V-shaped groove, and after being sufficiently dried, a concave part at the surface of the joint part 11 was measured by a dial gauge (or dial indicator) in order to evaluate the shrinkage or the so-called depression. The coating and drying of the joint filler composition having a satisfactory workability and/or operation ease of coating (or applying) were repeated until the top surface of the plaster boards and the top surface of the joint part 11 approximately match, that is, until there is no concave part in the joint part 11. The number of times the coating and drying are repeated is indicated in FIGS. 1 through 4 as the "number of times coated until joint part becomes smooth".

The evaluation result of the workability is indicated by a symbol "o" when satisfactory, and by a symbol "x" when unsatisfactory. The workability is regarded to be unsatisfactory when it is difficult to fill the joint filler composition into the joint part 11 due to causes such as insufficient spreading of the joint filler composition, for example.

In FIGS. 1 through 4, "water/powder (%)" indicates a percentage representation of a ratio of the mass of water with respect to a sum total mass of the base material, the inorganic hollow particles, the mineral having the chain structure or the layer structure, the resin agent, the set adjusting agent, and the thickener in the joint filler composition. The set adjusting agent is used when the base material is calcium sulfate hemihydrate as illustrated in FIGS. 1 and 2. The amount of water to be added was adjusted in order to optimize the viscosity and the density of each sample from the point of view of the workability and/or operation ease of coating (or applying) the joint filler composition.

Known materials generally used in joint filler compositions were used for the resin agent, the set adjusting agent, and the thicknener. As an example, this embodiment used polyvinyl alcohol as the resin agent, gypsum dehydrate as the set adjusting agent, and a cellulose ether as the thickener.

The example embodiments Emb1 and Emb2 used calcium sulfate hemihydrate as the base material, in order to form a setting type joint filler composition. In addition, the example embodiments Emb3 and Emb4 used calcium carbonate as the base material.

[Example Embodiment Emb1]

As described above, this example embodiment Emb1 used calcium sulfate hemihydrate as the base material. In addition, Shirasu Balloon was used as the inorganic hollow particles, and mica was used as the mineral having the chain structure or the layer structure. The amounts of the inorganic hollow particles and the mineral having the chain structure or the layer structure that are added were varied in order to evaluate the performance. Further, a first comparison example in which the inorganic hollow particles and the mineral having the chain structure or the layer structure are not added, or only one of the inorganic hollow particles and the mineral having the chain structure or the layer structure is added, were also evaluated. In FIG. 1 and each of FIGS. 2 through 4, 6 and 7 which will be described later, an entry that is blank indicates that the amount of the corresponding material that is added is zero (0).

In samples No. 011 through No. 015 of the example embodiment Emb1 that simultaneously use the inorganic hollow particles and the mineral having the chain structure or the layer structure, the shrinkage was 0.2 mm to 0.4 mm, as illustrated in FIG. 1. In a sample No. 111 of the first comparison example in which no inorganic hollow particles and no mineral having the chain structure or the layer structure is added but the conditions are otherwise similar to those of the samples No. 011 through No. 015, the shrinkage was 1.0 mm. Hence, it was confirmed that the shrinkage of the samples No. 011 through No. 015 is one-half or less compared to the shrinkage of the sample No. 111. In addition, in samples No. 112 and No. 113 of the first comparison example in which only one of the inorganic hollow particles and the mineral having the chain structure or the layer structure is added but the conditions are otherwise similar to those of the samples No. 011 through No. 015, the shrinkage was 0.8 mm and 1.0 mm, respectively. Hence, it was confirmed that the effect of reducing the shrinkage in the samples No. 112 and No. 113 is small compared to that of the samples No. 011 through No. 015. In the case of the sample No. 113 in which only mica is added, no change was observed when compared to the case in which no mica is added. In other words, adding only mica does not generate the effect of reducing the shrinkage of the joint filler composition. In addition, in a sample No. 114 of the first comparison example in which a large amount of inorganic hollow particles is added but the conditions are otherwise similar to those of the samples No. 011 through No. 015, the shrinkage was 0.2 mm, however, the workability was unsatisfactory ("x") and unsuited for practical use in that the joint filler composition may not easily fill the V-shaped groove of the joint part 11.

Therefore, when the inorganic hollow particles and the mineral having the chain structure or the layer structure are combined, it was confirmed that a satisfactory workability and a greatly reduced shrinkage or the so-called depression of the joint filler composition may be achieved simultaneously. It may be regarded that the satisfactory workability and the reduced shrinkage or the so-called depression of the joint filler composition are simultaneously achieved by some kind of interaction when the inorganic hollow particles and the mineral having the chain structure or the layer structure are combined. Moreover, because the shrinkage or the so-called depression is reduced, the number of times the joint filler composition needs to be coated in order to make the joint part 11 flat and aligned to the surface of the adjacent base members 101-1 and 101-2 may be reduced to two times from three times, for example, which in turn may shorten the time of completion.

[Example Embodiment Emb2]

As described above, this example embodiment Emb2 used calcium sulfate hemihydrate as the base material, similarly as in the case of the example embodiment Emb1 described above. However, flyash, perlite or glass balloon was used as the inorganic hollow particles, and wollastonite, attapulgite, bentonite or sepiolite was used as the mineral having the chain structure or the layer structure. The amounts of the inorganic hollow particles and the mineral having the chain structure or the layer structure that are added were varied for a second comparison example in order to evaluate the performance.

In samples No. 021 through No. 025 of the example embodiment Emb2, the shrinkage was 0.5 mm or less and small, and the workability was satisfactory ("o"), as illustrated in FIG. 2. In addition, the number of times the joint filler composition needs to be coated in order to make the joint part 11 flat and aligned to the surface of the adjacent base members 101-1 and 101-2 may be reduced to two times, similarly as in the case of the example embodiment Emb1 described above. In other words, it was confirmed that the object according to one aspect of the present invention may be achieved by including the inorganic hollow particles and the mineral having the chain structure or the layer structure in the joint filler composition, without limiting the inorganic hollow particles and the mineral having the chain structure or the layer structure to particular materials.

On the other hand, in samples No. 121 and No. 122 of the second comparison example in which one of the inorganic hollow particles and the mineral having the chain structure or the layer structure is added by an excessively large amount, it was confirmed that the workability deteriorates and the joint filler composition becomes unsuited for practical use. In addition, in samples No. 123 and No. 124 of the second comparison example in which at least one of the inorganic hollow particles and the mineral having the chain structure or the layer structure is added by an insufficient small amount, it was confirmed that substantially no reduction may be observed in the shrinkage. Therefore, it was confirmed that each of the inorganic hollow particles and the mineral having the chain structure or the layer structure needs to be added by a predetermined amount, in order to achieve the object according to one aspect of the present invention.

[Example Embodiment Emb3]

As described above, this example embodiment Emb3 used calcium carbonate as the base material. In addition, Shirasu Balloon was used as the inorganic hollow particles, and mica was used as the mineral having the chain structure or the layer structure. The amounts of the inorganic hollow particles and the mineral having the chain structure or the layer structure that are added were varied in order to evaluate the performance. Further, a third comparison example in which the inorganic hollow particles and the mineral having the chain structure or the layer structure are not added, or only one of the inorganic hollow particles and the mineral having the chain structure or the layer structure is added, were also evaluated.

In samples No. 031 through No. 035 of the example embodiment Emb3 in which both the inorganic hollow particles and the mineral having the chain structure or the layer structure were used, the shrinkage was 0.4 mm to 0.8 mm, and the workability was satisfactory ("o"), as illustrated in FIG. 3. On the other hand, in a sample No. 131 of the third comparison example in which no inorganic hollow particles and no mineral having the chain structure or the layer structure is added, the shrinkage was 1.5 mm. Hence, it was confirmed that the shrinkage in the samples No. 031 through No. 035 may be reduced to one-half or less compared to the shrinkage of the sample No. 131 of the third comparison example.

On the other hand, in samples No. 132 and No. 133 of the third comparison example in which only one of the inorganic hollow particles and the mineral having the chain structure or the layer structure is added, the shrinkage was 1.2 mm and 1.4 mm, respectively, and it was confirmed that no substantial reduction may be observed in the shrinkage. Particularly in the case of the sample No. 133 in which only mica is added, it was confirmed that virtually no reduction may be observed in the shrinkage. Moreover, in the case of the sample No. 134 in which a large amount of inorganic hollow particles is added in order to obtain the effect of reducing the shrinkage to an extent similar to that of the example embodiment Emb3, it was confirmed that the shrinkage is reduced but the workability deteriorates and becomes unsatisfactory ("x") such that the joint filler composition becomes unsuited for practical use. Hence, these results are consistent with the results obtained for the case in which the calcium sulfate hemihydrate is used as the base material.

Therefore, it was confirmed that, in the example embodiment Emb3, the shrinkage may be reduced while maintaining the workability satisfactory, even when calcium carbonate is used as the base material. In other words, the joint filler composition in accordance with one aspect of the present invention may be applied to the joint filler compositions in general, regardless of the kind of base material used.

[Example Embodiment Emb4]

As described above, this example embodiment Emb4 used calcium carbonate as the base material. However, flyash, perlite or glass balloon was used as the inorganic hollow particles, and wollastonite, attapulgite, bentonite or sepiolite was used as the mineral having the chain structure or the layer structure. The amounts of the inorganic hollow particles and the mineral having the chain structure or the layer structure that are added were varied for a fourth comparison example in order to evaluate the performance.

In samples No. 041 through No. 045 of the example embodiment Emb4, the shrinkage was 0.8 mm to 1.0 mm and small, and the workability was satisfactory ("o"), as illustrated in FIG. 4. In addition, the number of times the joint filler composition needs to be coated in order to make the joint part 11 flat and aligned to the surface of the adjacent base members 101-1 and 101-2 may be reduced to three times, similarly as in the case of the example embodiment Emb3 described above. In other words, it was continued that the object according to one aspect of the present invention may be achieved by including a predetermined amount of the inorganic hollow particles and a predetermined amount of the mineral having the chain structure or the layer structure in the joint filler composition, without limiting the inorganic hollow particles and the mineral having the chain structure or the layer structure to particular materials.

On the other hand, in samples No. 141 and No. 142 of the fourth comparison example in which one of the inorganic hollow particles and the mineral having the chain structure or the layer structure is added by an excessively large amount, it was confirmed that the workability deteriorates and becomes unsatisfactory ("x") such that the joint filler composition becomes unsuited for practical use. In addition, in samples No. 143 and No. 144 of the fourth comparison example in which one of the inorganic hollow particles and the mineral having the chain structure or the layer structure is added by an insufficient small amount, it was confirmed that no substantial reduction may be observed in the shrinkage and that the object according to one aspect of the present invention may not be achieved. Therefore, it was confirmed that each of the inorganic hollow particles and the mineral having the chain structure or the layer structure needs to be added by a predetermined amount, in order to achieve the object according to one aspect of the present invention.

Hence, according to one aspect of the present invention, each of the inorganic hollow particles and the mineral having the chain structure or the layer structure are simultaneously added by a predetermined amount in the joint filler composition, and thus, the shrinkage of the joint filler composition may be reduced while maintaining the satisfactory operation performance, unlike the cases in which only one of the inorganic hollow particles and the mineral having the chain structure or the layer structure is added.

[Example Embodiment Emb5]

Figure 6:
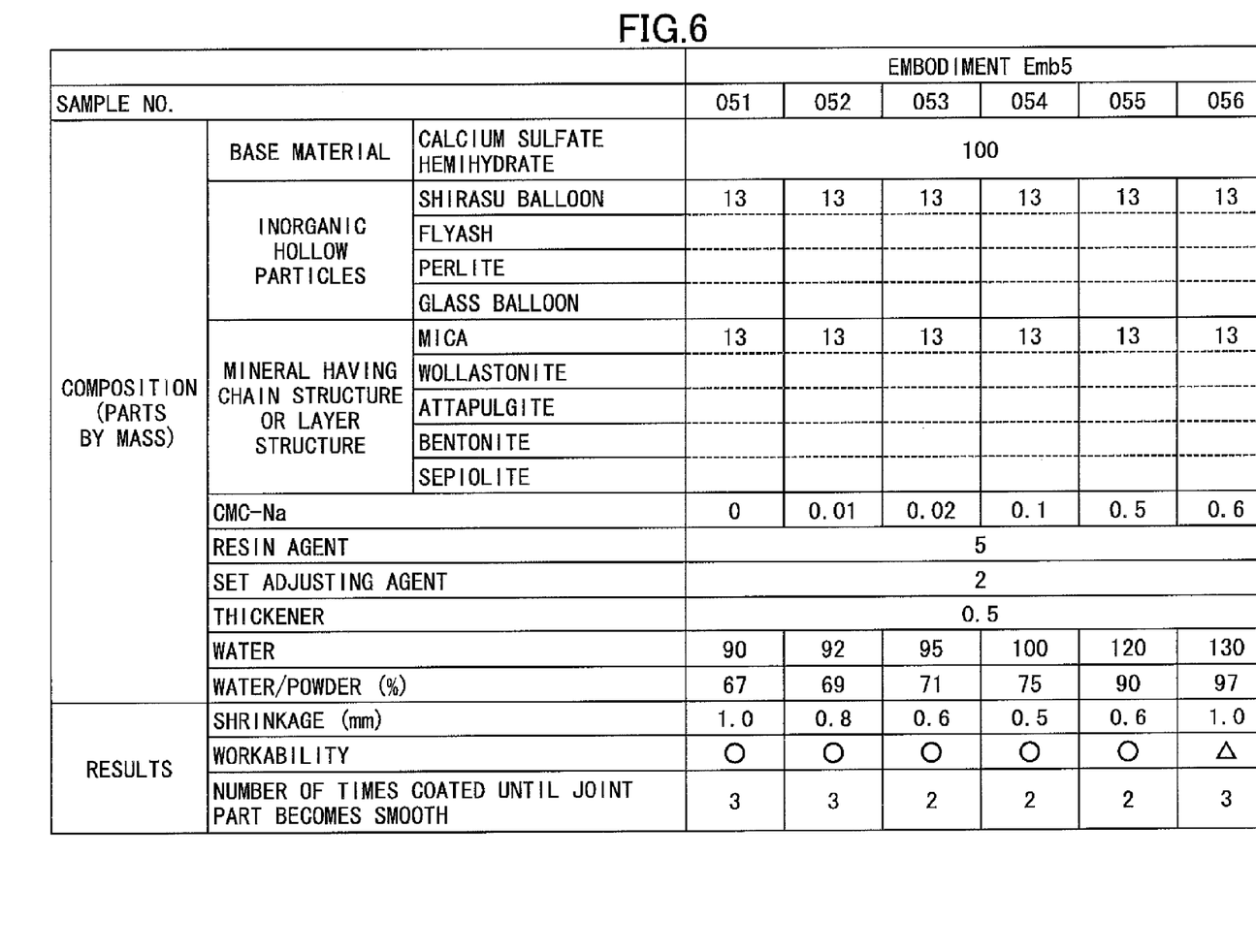
FIG. 6 is a diagram illustrating the mass ratio of materials forming a joint filler composition in an example embodiment Emb5.
Figure 7:
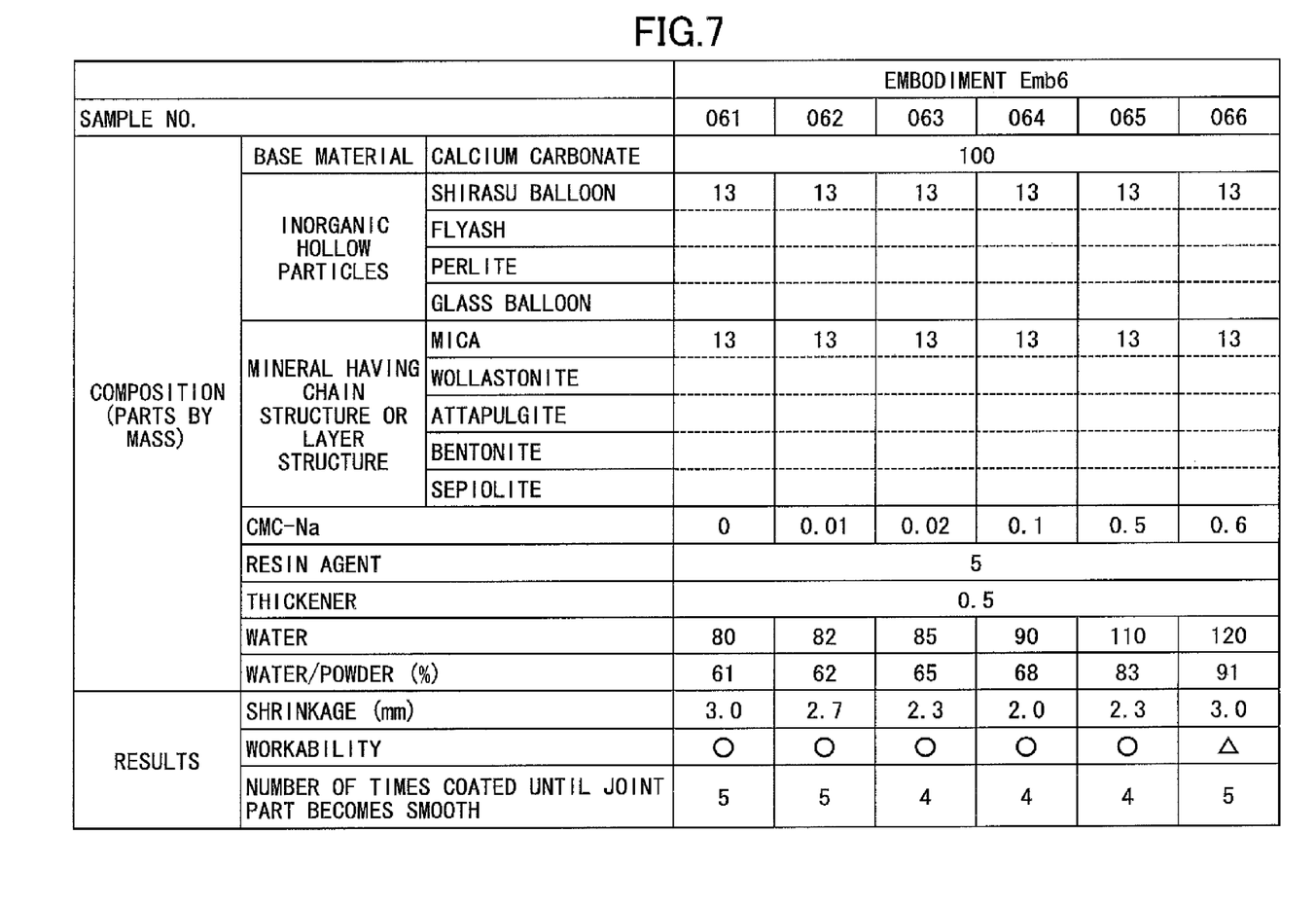
FIG. 7 is a diagram illustrating the mass ratio of materials forming the joint filler composition in an example embodiment Emb6.

Example embodiments Emb5 and Emb6 were created with a mass ratio of materials forming a joint filler composition illustrated in FIGS. 6 and 7, by mixing these materials, in order to obtain a joint filler composition using the joint filler composition in accordance with one aspect of the present invention.

The example embodiments Emb5 and Emb6 used carboxy methylcellulose sodium (hereinafter also referred to as CMC-Na) as an additive, in order to evaluate the effects of including the additive in the joint filler composition.

Shirasu Balloon was used as the inorganic hollow particles, and mica was used as the mineral having the chain structure or the layer structure. The amount of the CMC-Na added was varied in order to evaluate the performance.

Figure 8:
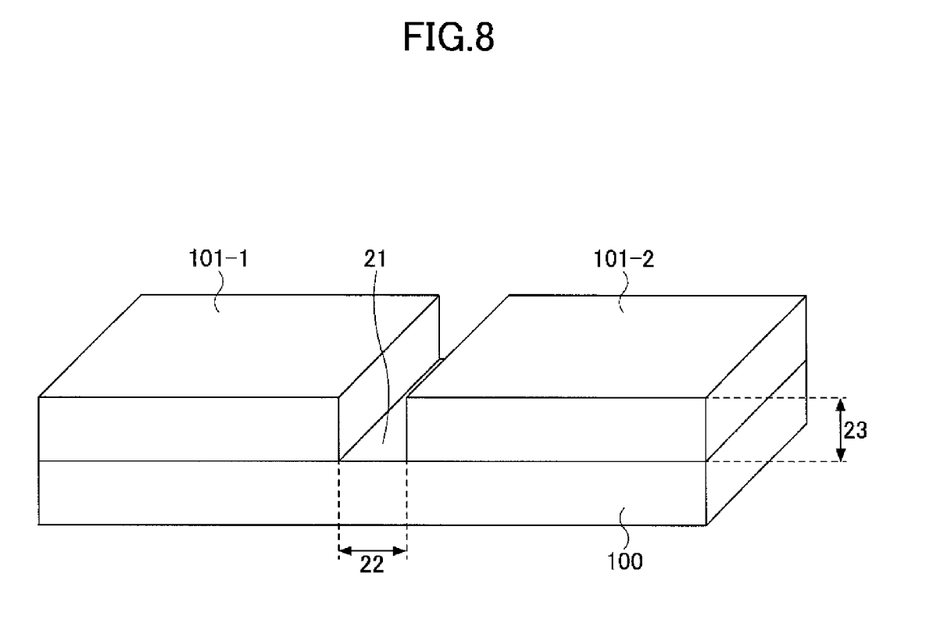
FIG. 8 is a diagram for explaining an evaluation method for the example embodiments Emb5 and Emb6.

FIG. 8 is a diagram for explaining an evaluation method for the example embodiments Emb5 and Emb6. FIG. 8 illustrates a perspective view of a base 100, and adjacent base members 101-1 and 101-2 provided on the base 100, in order to simulate the usage of the joint filler composition at the actual construction site. For example, the base members 101-1 and 101-2 are formed by plaster boards forming a joint part 11 that has a U-shaped groove having a rectangular cross section. For example, the U-shaped groove has a width 22 of 10 mm, and a depth 23 of 12.5 mm.

The joint filler composition of the example embodiments Emb5 and Emb6 were coated once on the joint part 11 to fill the U-shaped groove, and after being sufficiently dried, a concave part at the surface of the joint part 11 was measured by a dial gauge (or dial indicator) in order to evaluate the shrinkage or the so-called depression. The coating and drying of the joint filler composition having a satisfactory workability and/or operation ease of coating (or applying) were repeated until the top surface of the plaster boards and the top surface of the joint part 11 approximately match, that is, until there is no concave part in the joint part 11. The number of times the coating and drying are repeated is indicated in FIGS. 6 and 7 as the "number of times coated until joint part becomes smooth".

The evaluation result of the workability is indicated by a symbol "o" when satisfactory, and by a symbol "Δ" when the coating is slightly difficult. The workability is regarded to be slightly difficult when it is slightly difficult to spread the joint filler composition and a predetermined force is required to spread the joint filler composition to fill the joint part 11.

In FIGS. 6 and 7, "water/powder (%)" indicates a percentage representation of a ratio of the mass of water with respect to a sum total mass of the base material, the inorganic hollow particles, the mineral having the chain structure or the layer structure, the resin agent, the set adjusting agent, the thickener, and the CMC-Na in the joint filler composition. The set adjusting agent is used when the base material is calcium sulfate hemihydrate as illustrated in FIG. 6. The amount of water to be added was adjusted in order to optimize the viscosity and the density of each sample from the point of view of the workability and/or operation ease of coating (or applying) the joint filler composition.

Known materials generally used in joint filler compositions were used for the resin agent, the set adjusting agent, and the thicknener. As an example, this embodiment used polyvinyl alcohol as the resin agent, gypsum dehydrate as the set adjusting agent, and a methyl cellulose as the thickener.

FIG. 6 is a diagram illustrating the mass ratio of materials forming the joint filler composition in the example embodiment Emb5. The example embodiment Emb5 used calcium sulfate hemihydrate as the base material.

In samples No. 052 through No. 055 of the example embodiment Emb5 that add the CMC-Na, it was confirmed that the shrinkage may be reduced without deteriorating the workability, when compared to a sample No. 051 of the example embodiment Emb5 that does not add the CMC-Na, as illustrated in FIG. 6. Particularly in the case of the sample No. 054, it was confirmed that the shrinkage is reduced to a maximum of one-half when compared to the shrinkage of the sample No. 051. In addition, the number of times the joint filler composition needs to be coated in order to make the joint part 11 flat and aligned to the surface of the adjacent base members 101-1 and 101-2, may be reduced to two times from three times, for example. In the case of a sample No. 056 that adds a considerably large amount of the CMC-Na, it was confirmed that the performance is sufficiently high in that the effect of reducing the shrinkage is approximately the same as that for the case in which no CMC-Na is added, however, it was confirmed that the performance deteriorates.

It was confirmed that the shrinkage of the joint filler composition may be reduced, and the number of times the joint filler composition needs to be coated and dried may be reduced, by adding the CMC and the salt thereof. It may be regarded that the reduced shrinkage of the joint filler composition and the reduced number of repetitions of the joint filler composition coating and drying process are achieved by some kind of interaction that occurs when the inorganic hollow particles, the mineral having the chain structure or the layer structure, and the CMC and the salt thereof are added simultaneously, or by the function of the CMC and the salt thereof preventing the air bubbles included within the joint filler composition from breaking (or collapsing).

[Example Embodiment Emb6]

FIG. 7 is a diagram illustrating the mass ratio of materials forming the joint filler composition in the example embodiment Emb6. The example embodiment Emb6 used calcium carbonate as the base material. Otherwise, the composition of the example embodiment Emb6 is the same as that of the example embodiment Emb5 described above.

In samples No. 062 through No. 065 of the example embodiment Emb6 that add the CMC-Na, it was confirmed that the shrinkage may be reduced without deteriorating the workability, when compared to a sample No. 061 of the example embodiment Emb6 that does not add the CMC-Na, as illustrated in FIG. 7. Particularly in the case of the sample No. 064, it was confirmed that the shrinkage is reduced to a maximum of ⅔ when compared to the shrinkage of the sample No. 051. In addition, the number of times the joint filler composition needs to be coated in order to make the joint part 11 flat and aligned to the surface of the adjacent base members 101-1 and 101-2, may be reduced to four times from five times, for example. In the case of a sample No. 066 that adds a considerably large amount of the CMC-Na, it was confirmed that the performance is sufficiently high in that the effect of reducing the shrinkage is approximately the same as that for the case in which no CMC-Na is added, however, it was confirmed that the performance deteriorates.

It was confirmed that the shrinkage of the joint filler composition may be reduced, and the number of times the joint filler composition needs to be coated and dried may be reduced, by adding the CMC and the salt thereof. It may be regarded that the reduced shrinkage of the joint filler composition and the reduced number of repetitions of the joint filler composition coating and drying process are achieved by some kind of interaction that occurs when the inorganic hollow particles, the mineral having the chain structure or the layer structure, and the CMC and the salt thereof are added simultaneously, or by the function of the CMC and the salt thereof preventing the air bubbles included within the joint filler composition from breaking (or collapsing).

Therefore, when the inorganic hollow particles, the mineral having the chain structure or the layer structure, and the CMC-Na are combined, it was confirmed that a satisfactory workability and a greatly reduced shrinkage or the so-called depression of the joint filler composition may be achieved simultaneously. Moreover, because the shrinkage or the so-called depression is reduced, the number of times the joint filler composition needs to be coated in order to make the joint part 11 flat and aligned to the surface of the adjacent base members 101-1 and 101-2, may be reduced to two times from three times, for example, which in turn may shorten the time of completion.

The present invention is described above in detail with reference to specific embodiments, however, it may be apparent to those skilled in the art that various variations, modifications, and substitutions may be made without departing from the spirit and scope of the present invention.

What is claimed is:

1. A setting type joint filler composition comprising:
   100 parts by mass of calcium sulfate hemihydrate;
   1 to 20 parts by mass of inorganic hollow particles; and
   5 to 15 parts by mass of a mineral having a chain structure or a layer structure.

2. The setting type joint filler composition as claimed in claim 1, wherein the mineral having the chain structure or the layer structure is at least one material selected from a group consisting of mica, wollastonite, bentonite, attapulgite, and sepiolite.

3. The setting type joint filler composition as claimed in claim 2, wherein the mineral having the chain structure or the layer structure is mica.

4. The setting type joint filler composition as claimed in claim 1, wherein the at least the mineral having the chain structure or the layer structure is 8 to 15 parts by mass with respect to the 100 parts by mass of the calcium sulfate hemihydrate.

5. The setting type joint filler composition as claimed in claim 1, wherein the inorganic hollow particles are at least one material selected from a group consisting of Shirasu Balloon, flyash, perlite, and glass balloon.

6. The setting type joint filler composition as claimed in claim 5, wherein the inorganic hollow particles are Shirasu Balloon.

7. The setting type joint filler composition as claimed in claim 1, wherein the inorganic hollow particles are 5 to 15 parts by mass with respect to the 100 parts by mass of the calcium sulfate hemihydrate.

8. The setting type joint filler composition as claimed in claim 1, further comprising:
   at least one kind of carboxy methylcellulose and salt thereof.

9. The setting type joint filler composition as claimed in claim 8, wherein the at least one kind of carboxy methylcellulose and salt thereof are 0.02 to 0.5 parts by mass with respect to the 100 parts by mass of the calcium sulfate hemihydrate.

10. A method of forming a paste of the setting type joint filler composition as claimed in claim 1, comprising:

mixing water to the calcium sulfate hemihydrate, the inorganic hollow particles, and the mineral, in order to form the paste of the setting type joint filler composition.

11. A method of forming a paste of the setting type joint filler composition as claimed in claim 8, comprising:
mixing water to the calcium sulfate hemihydrate, the inorganic hollow particles, the mineral, and the at least one kind of carboxy methylcellulose and salt thereof, in order to form the paste of the setting type joint filler composition.

12. A setting type joint filler composition comprising:
100 parts by mass of calcium sulfate hemihydrate;
1 to 20 parts by mass of inorganic hollow particles;
5 to 15 parts by mass of a mineral having a chain structure or a layer structure; and
water.

13. The setting type joint filler composition as claimed in claim 12, further comprising:
at least one kind of carboxy methylcellulose and salt thereof.

\* \* \* \* \*